United States Patent
Koziolek et al.

(10) Patent No.: US 12,412,238 B2
(45) Date of Patent: Sep. 9, 2025

(54) PROCESS GRAPHICS GENERATOR FOR A ZOOMABLE DIAGRAM REPRESENTING AN INDUSTRIAL PROCESS PLANT

(71) Applicant: ABB Schweiz AG, Baden (CH)

(72) Inventors: Heiko Koziolek, Karlsruhe (DE); Julius Rueckert, Langen (DE); Benjamin Kloepper, Mannheim (DE); Hadil Abukwaik, Weinheim (DE); Pablo Rodriguez, Ilvesheim (DE); Andreas Berlet, Schriesheim (DE)

(73) Assignee: ABB Schweiz AG, Baden (CH)

( * ) Notice: Subject to any disclaimer, the term of this patent is extended or adjusted under 35 U.S.C. 154(b) by 184 days.

(21) Appl. No.: 17/959,480

(22) Filed: Oct. 4, 2022

(65) Prior Publication Data
US 2023/0109414 A1    Apr. 6, 2023

(30) Foreign Application Priority Data
Oct. 5, 2021    (EP) .................................... 21201012

(51) Int. Cl.
*G06T 3/40*    (2024.01)
*G06T 11/20*    (2006.01)
(Continued)

(52) U.S. Cl.
CPC .............. *G06T 3/40* (2013.01); *G06T 11/206* (2013.01); *G06T 11/60* (2013.01); *G06T 2210/36* (2013.01); *G08B 21/00* (2013.01)

(58) Field of Classification Search
CPC ......... G06T 3/40; G06T 11/206; G06T 11/60; G06T 2210/36; G08B 21/00
See application file for complete search history.

(56) References Cited

U.S. PATENT DOCUMENTS

| 8,479,097 B2 | 7/2013 | Husoy et al. |
| 9,092,122 B2 | 7/2015 | Husoy et al. |

(Continued)

FOREIGN PATENT DOCUMENTS

| CN | 112578765 A | 3/2021 |
| EP | 3279755 A | 2/2018 |

(Continued)

OTHER PUBLICATIONS

European Patent Office, Extended European Search Report in European Patent Application No. 21201012.8, 7 pp. (Mar. 16, 2022).

(Continued)

*Primary Examiner* — Michelle L Sams
(74) *Attorney, Agent, or Firm* — Leydig, Voit & Mayer, Ltd.

(57) ABSTRACT

A method used for generating a zoomable diagram includes providing a topology diagram of at least a part of the industrial plant for interacting with components of the industrial plant; generating, for each zoom-level of the zoomable diagram, a zoomed diagram comprising a zoomed view of each one of the plurality of objects and connections, by applying at least following rules to each object: from a first predefined zoom-level, collapse all objects of a plant-segment to one object and keep only connections that cross the plant-segment's border, and introduce an plant-segment related alarm measure as a function of all alarm statuses of the plurality of objects of the plant-segment; and when interacting with the components of the industrial plant, determining, for each plant-segment, the plant-segment related alarm measure, and outputting the plant-segment related alarm measure for healing a cause of the alarm.

18 Claims, 3 Drawing Sheets

(51) Int. Cl.
*G06T 11/60* (2006.01)
*G08B 21/00* (2006.01)

(56) References Cited

U.S. PATENT DOCUMENTS

| | | | |
|---|---|---|---|
| 10,528,042 B2 | 1/2020 | Haller et al. | |
| 10,719,650 B1* | 7/2020 | Sanders | G06F 30/39 |
| 2004/0051739 A1* | 3/2004 | Schmickley | G08B 29/188 |
| | | | 715/772 |
| 2005/0222698 A1* | 10/2005 | Eryurek | G06F 8/34 |
| | | | 700/90 |
| 2012/0062567 A1* | 3/2012 | Baier | G06Q 10/06 |
| | | | 345/428 |
| 2012/0167015 A1* | 6/2012 | Martick | G06T 19/00 |
| | | | 715/853 |
| 2014/0282215 A1* | 9/2014 | Grubbs | G06F 3/04883 |
| | | | 715/781 |
| 2014/0372927 A1* | 12/2014 | Hebert | G06F 9/451 |
| | | | 715/771 |
| 2016/0292895 A1 | 10/2016 | Billi et al. | |
| 2017/0293418 A1 | 10/2017 | Hams et al. | |
| 2018/0039261 A1 | 2/2018 | Haller et al. | |
| 2020/0310840 A1 | 10/2020 | Koziolek et al. | |

FOREIGN PATENT DOCUMENTS

| | | | | |
|---|---|---|---|---|
| EP | 3279755 B1 * | 9/2021 | | G05B 23/0221 |
| WO | WO-2020198250 A1 * | 10/2020 | | G05B 17/02 |

OTHER PUBLICATIONS

The Patent Office of the People's Republic of China, Office Action in Chinese Patent Application No. 202211196240.4, 13 pp. (Mar. 14, 2025).

* cited by examiner

PROCESS GRAPHICS GENERATOR FOR A ZOOMABLE DIAGRAM REPRESENTING AN INDUSTRIAL PROCESS PLANT

CROSS-REFERENCE TO RELATED APPLICATIONS

This patent application claims priority to European Patent Application No. 21201012.8, filed on Oct. 5, 2021, which is incorporated herein in its entirety by reference.

FIELD OF THE DISCLOSURE

The present disclosure relates to the field of controlling an industrial process plant and, more particularly, to a control method that utilizes a zoomable topology diagram.

BACKGROUND OF THE INVENTION

Operators of industrial plants or process plants often use topology diagrams or process graphics for observing the components of the plant and/or for interacting with the plant's components and/or with its process control system. However, at least some plants have a high complexity, which may impede an understanding of the complete topology of the plant. In at least some cases, a zoomable topology diagram representing the plant's components may be helpful. But, providing such a diagram may lead to a high effort for preparing a plurality of zoom-level for the zoomable diagram.

BRIEF SUMMARY OF THE INVENTION

The present disclosure describes an at least partly automated method for providing a zoomable topology diagram. One aspect relates to a method for generating a zoomable diagram of an industrial plant for an analysis of an alarm, the method comprising the steps of:
- providing a topology diagram of at least a part of the industrial plant for interacting with components of the industrial plant, wherein the topology diagram comprises a plurality of objects, which each represent a component of the industrial plant, and a plurality of connections, which each represent a logical and/or a physical connection between at least two of the components;
- generating, for each zoom-level of the zoomable diagram, a zoomed diagram comprising a zoomed view of each one of the plurality of objects and the plurality of connections, wherein the zoomed view is generated by applying (at least) following rules to each object: from a first predefined zoom-level, collapse all objects of a plant-segment to one object and keep only connections that cross the plant-segment's border, and introduce an plant-segment related alarm measure as a function of all alarm statuses of the plurality of objects of the plant-segment;

In one embodiment, the method further includes storing the zoomed diagram for each of the zoom-levels; and, when interacting with the components of the industrial plant utilizing the plurality of zoomable diagrams, determining, for each plant-segment, the plant-segment related alarm measure, and outputting the plant-segment related alarm measure for healing a cause of the alarm.

DETAILED DESCRIPTION OF THE INVENTION

Figure 1:
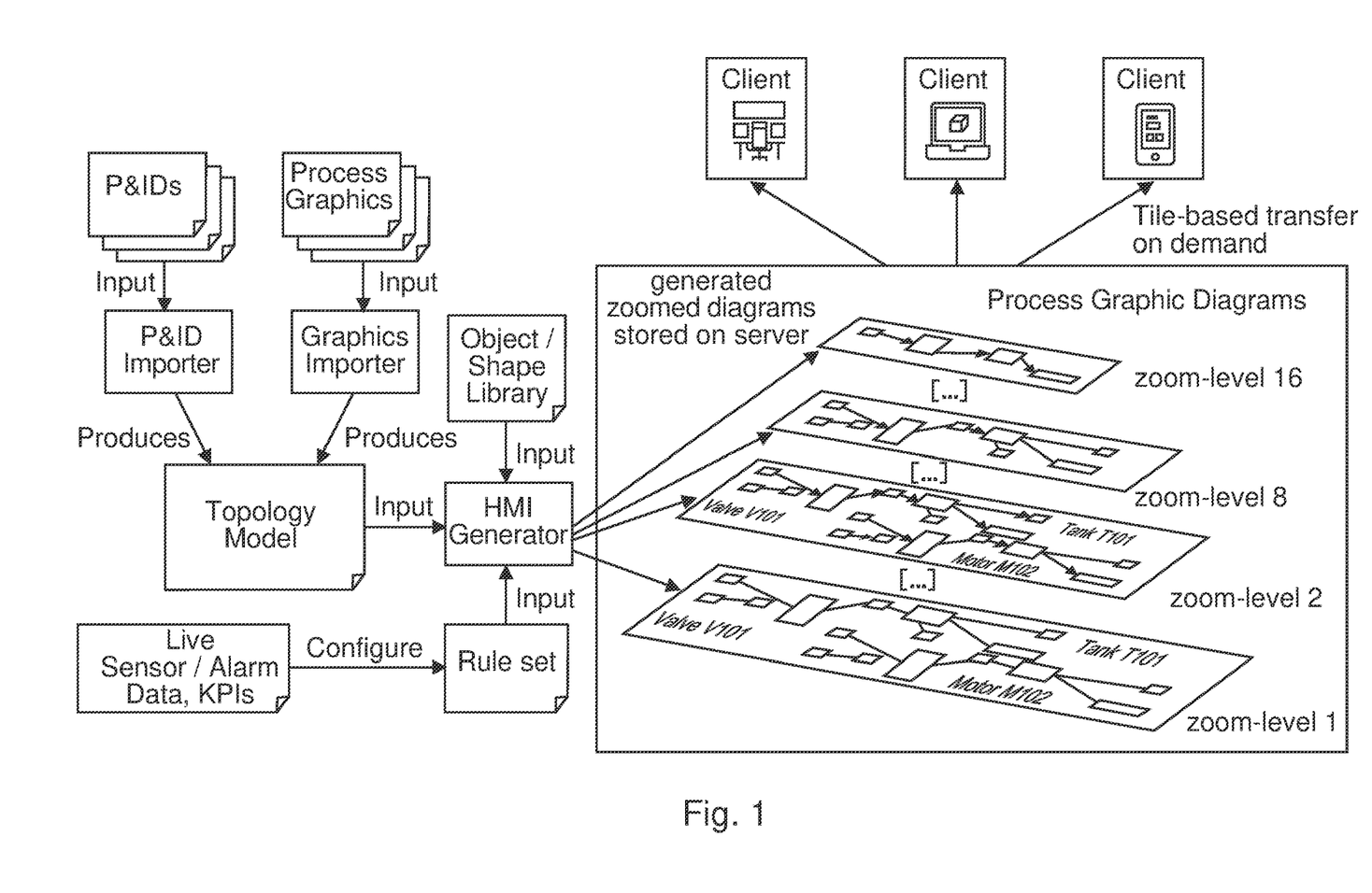
FIG. 1 is a schematic diagram of a human-machine interface (HMI) Generator in accordance with the disclosure.

FIG. 1 depicts schematically an HMI Generator (HMI: Human Machine Interface) according to an embodiment. FIG. 1 shows inputs and outputs of the HMI Generator. The HMI Generator processes as input a topology model or topology diagram, i.e. an object-oriented class model for plant topologies. As an example for a topology diagram, a piping and instrumentation diagram (P&ID), is shown. The topology diagram, however, that is actually used may only support a subset of a P&ID semantic, and/or may additionally support elements of a superset of a P&ID semantic, for example pictures, trend chart, an ability of coloring the objects, and further attributes. The topology diagram, at least, comprises a plurality of objects, which each represent a component of the industrial plant, and a plurality of connections, which each represent a logical and/or a physical connection between at least two of the components. The diagram may include classes for concepts such as vessels, pipes, valves, motors, pumps, conveyors, etc. Each object or topology element may carry at least minimal information required for positioning objects in a 2D graphic, e.g. a size and a position of the element, e.g. in xy-coordinates. Optionally, the HMI Generator can process 2D-drawing instructions for a custom shape—e.g. a path of 2D coordinates—that may be stored in the topology model.

As depicted in FIG. 1, topology models can be generated by importing piping and instrumentation diagrams (P&IDs), and/or or by importing existing process graphics. P&IDs may be available from the plant design phase and may, e.g., be used in green field projects to produce topology models, since they carry more information than process graphics. Process graphics may be one option for existing systems, e.g. in cases when original P&IDs with a high detail level are lost or outdated. In this case, an importer may be used for reading the existing process graphics from an automation system to produce the topology model. The latter approach can be beneficial to give operators familiar looking graphics for existing plants, which eases adoption.

The HMI Generator may use an existing Object or Shape Library to generate process graphics for a specific automation system and a common look and feel. Such a library may, for example, contain pre-configured faceplates, control objects, and process graphics shapes. There may be graphics shapes pre-rendered for different zoom-levels. Using the library may require a pre-defined mapping between the elements in the topology model and the Object or Shape Library. Usually, this mapping may be provided once, and then be reused in several further projects, particularly if the topology meta model is not changed. The shape library may link topology elements to faceplates, i.e., small user interface panels for actuators.

In cases when the original P&IDs contained custom shapes that cannot be mapped to topology model classes and also have no counterparts in the shape library, these elements need to be excluded and a user warning may be issued. The user may then decide to manually extend the pre-defined mapping to assign custom shapes to existing topology model classes or even to extend the topology model itself.

The generated zoomed diagrams are stored on server. The server may be located in a cloud and/or on a site, where the zoomed diagram can be accessed by clients that are configured for displaying the zoomed diagrams. The clients, as schematically shown, may be (from right) a mobile device, e.g. a smartphone or a tablet, a laptop, and/or a "full-blown" editor, e.g. in a control station of the industrial plant, which may support several views on the plant's elements. The data transfer to the clients may be tile-based on demand.

Figure 2:
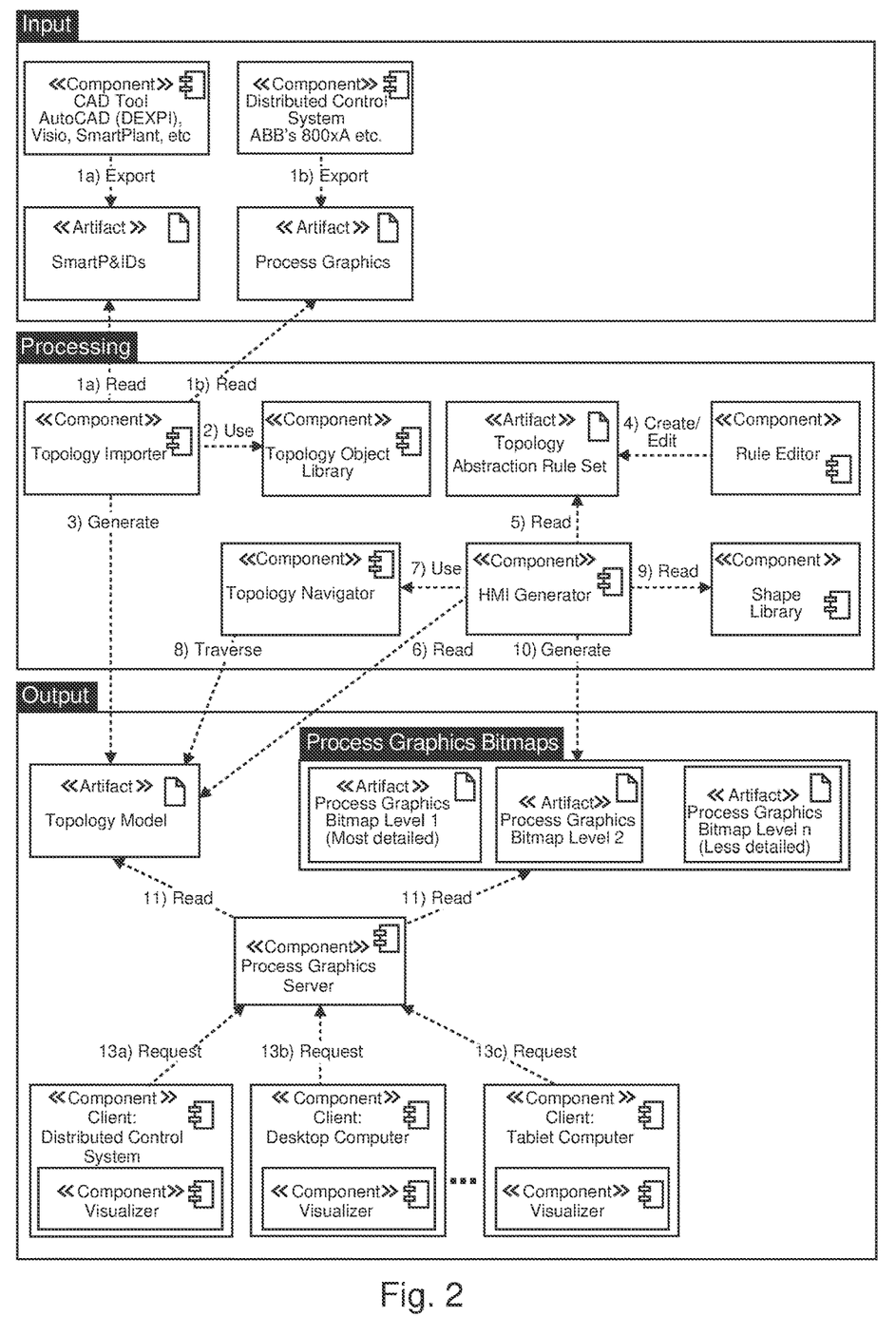
FIG. 2 is a schematic of a HMI Generator according to a further embodiment of the present disclosure.

FIG. 2 shows schematically an HMI Generator according to a further embodiment. Particularly, FIG. 2 shows an example of an implementation of the entire tool chain of the HMI Generator, which may be realized by different software components. A "Rule Editor" (e.g. a text editor that is able to edit the rules) may support specifying new abstraction rules, while a "Topology Navigator" may support browsing and debugging the imported topology models. The HMI Generator may include a user interface that, e.g., allows load rule sets from files, reviewing and configuring the rules, configuring the desired zoom-levels, setting the server URL to upload the generated graphics among other user settings.

In a variant of the HMI Generator, it may be applied during plant runtime to generate optimized operator graphics on-the-fly, tailored for the current conditions in the plant. As depicted in FIG. 1, the HMI Generator's rule set for process graphics generation maybe automatically re-configured based on live sensor or alarm data coming from the plant, possibly aggregated into higher level key performance indicators (KPIs) to reduce the required computational resources. The mechanism may allow the HMI Generator to provide more details for specific plant segments in case alarm conditions or unusual sensor readings. The abstraction rules used by the HMI Generator may therefore contain parameters that allow adjusting the abstraction level accordingly. For example, a vessel with alarm sensor reading may be excluded from hiding or fading out of the process graphics with such rules.

Figure 3:
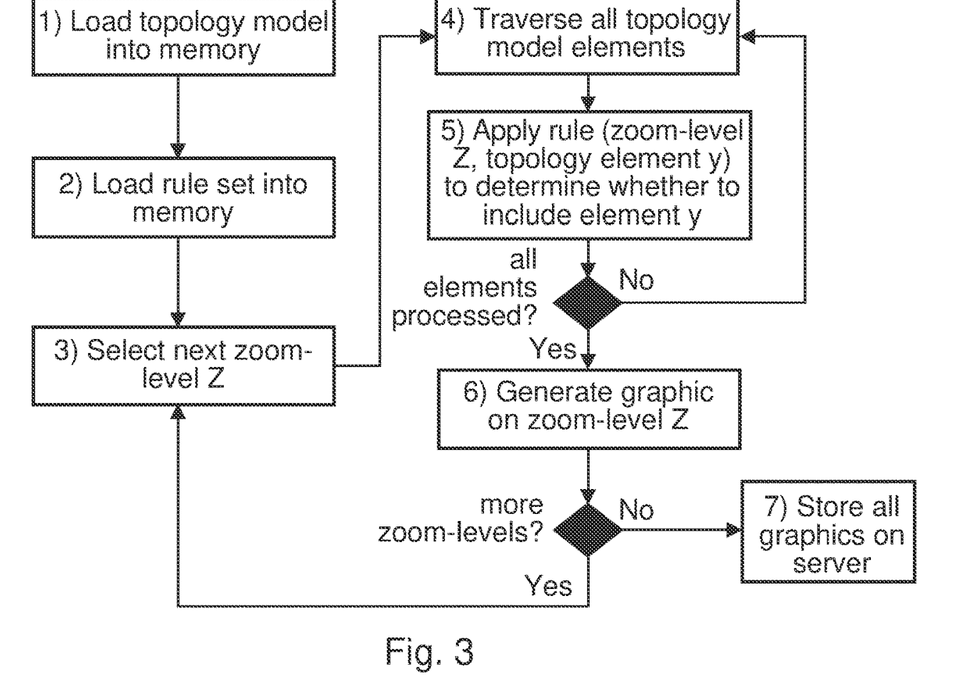
FIG. 3 is a flowchart for a method in accordance with the disclosure.

FIG. 3 shows a flow diagram according to an embodiment. The flow diagram depicts an example of how the HMI Generator may process the topology diagram or topology model. In steps 1) and 2), the HMI Generator may load the topology model and the rule set from several files into memory. The rule set may include several pre-specified instructions on how to synthesize higher-level process graphics on different abstraction or zoom-levels. The rules may be overlapping and thus also define additional precedence rules. At least some of the following rules may be included in such a set:

Fade-out or hide shapes smaller than size and position coordinates starting on a particular zoom-level (e.g., at a zoom-factor 15) and smaller. Larger elements (e.g., vessels) may remain visible, smaller ones (e.g., instruments) fade-out. Size and position coordinates may be gradually increase for fading-out on higher zoom-levels. Leave pipes displayed up to given zoom-level (e.g., at a zoom-factor>10) to keep the rough connections displayed.

Use a plant topology paired with rules that define importance of elements relative to each other. These can be domain-specific rules, e.g. an exemplary ranking "tank>pump>valve>other actuators>sensor". The rank may be used to spread the hiding of elements across zoom-levels. The topology is used to derive connectivity and flow-direction-related information to, e.g., generate accurate topology views for all zoom-level. In these zoom-levels, elements with a rank below the rank of the zoom-level and/or zoom-factor are hidden but pipes are shown between remaining elements to indicate that, e.g., a tank is connected to another tank, but omitting all other elements on the path, such as valves, sensors, etc.

Following the above steps may advantageously allows to generate zoom-levels based on a small set of domain-specific ranks and optionally defining fixed mappings for specific elements to a zoom-level— e.g. zoom-level 1 is assigned to the tank rank, etc. to achieve a common behavior across systems of the same domain.

Additionally, the method described above and/or below may provide a core set of general rules and potentially a database of domain-specific rule sets. In case desired, rule sets can be changed or augmented by rules specific to plant or customer preference. After changing the rule set, an automatic regeneration of zoom-levels is triggered.

If vessels have inner content, fade this out at particular zoom-levels (e.g. at a zoom-factor>15).

Fade-out textual annotations with font sizes smaller than a given size.

Merge redundant topology elements into single elements (e.g. merge a main pump with its auxiliary pump into a single pump, or merge two tanks into a single tank).

Fade-out all textual annotations (e.g. comments, notes) for a defined zoom-level (e.g. at a zoom-factor>15)

Use markers for plant-segments, (e.g. prefixes in the P&ID naming or structures from the process graphics) to generate higher level aggregates. For instance, "A1290-01-60-P33-001" may mean: this P&ID belongs to plant segment 60, or "A1290-01-40-P33-001" may mean: this P&ID belongs to plant segment 40.

Then, a frame may be drawn around all elements— objects and connections—of a specific plant segment (e.g., starting from a zoom-factor 15); said frame may have a border of e.g. 10 pixels. Partially overlapping frames may be ok.

Increase the size or visual representation of off-page references on defined zoom-levels (e.g. at a zoom-factor>15), because they become more important on higher zoom-levels. Fade-out or hide off-page references on defined zoom-levels (e.g. at a zoom-factor>5) and only display plant segment frames.

Synthesize higher-level trends: E.g. take all level sensors in an identified plant segment (e.g. 60), build the average filling level of all tanks, and create a trend chart for the average filling level in that plant segment.

Synthesize higher-level alarms: On defined zoom-levels (e.g. at a zoom-factor>10) check if there is an alarm in a plant segment and then color the frame for that segment, e.g. in red, and then fade-out individual alarms on sensors.

Synthesize higher-level KPIs: On a specific zoom-level interval (e.g. at a zoom-factor 10 or 5), fade out all topology elements in a plant segment and then only display higher level KPIs in the frame for the plant segment.

On which specific zoom-level and/or zoom-factor (e.g., 12 or 15) to fade out what element requires fine-tuning of the HMI Generator before actual production. The HMI Generator may include rules to generate a good macro-layout of all the P&IDs, e.g., to minimize the links between off-page references and to avoid overlaps.

The HMI Generator may produce graphics on a desired number of zoom-levels, e.g. 20). It starts with the lowest zoom-level and/or zoom-factor, that is supposed to include all elements of the topology model without any abstractions. The graphical representation of this zoom-level usually does not fit on a single screen, so a user normally only sees a small area of this zoom-level on a single screen. On the lowest zoom-level and/or zoom-factor, the HMI Generator does not yet apply the abstraction rules but generates a graphic as detailed as possible. In a step 3, the HMI Generator selects the next higher zooming level (e.g., 19) and, in a step 4, applies for each topology element the respective rules from the rule set that determine whether and how to integrate the element on this particular zoom-level (in a step 5). After having processed all elements on a given zoom-level, the HMI Generator may generate, in a step 6, a graphic, e.g. as a bitmap and/or a vector graphic. Further, it may generate a process graphic logic and signal configuration, which may be used, e.g. later on, to show live data in the graphic. Then, it goes back to step 3 for processing the next higher zoom-level. Finally, after all zoom-level have been processed, the HMI Generator stores all generated graphics and signal configurations, e.g. on a server, which can be accessed by clients.

Figure 4:
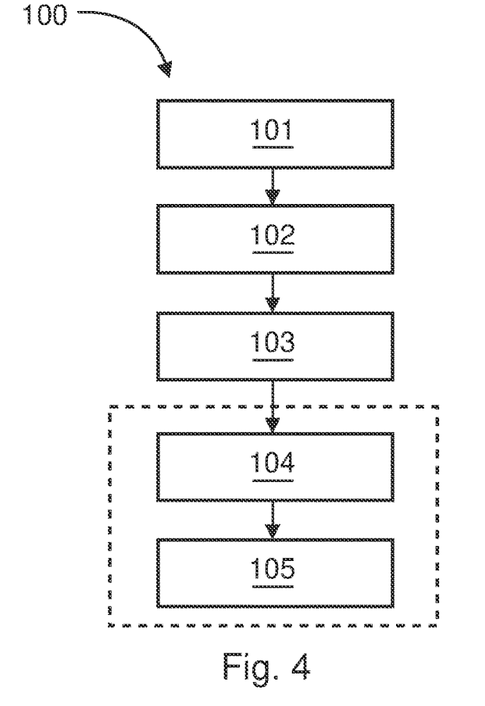
FIG. 4 is a flowchart for a method in accordance with a further embodiment of the present disclosure.

FIG. 4 shows a flow diagram according to a further embodiment, depicting a method for generating a zoomable diagram of an industrial plant for an analysis of an alarm. In a step 101, a topology diagram of at least a part of the industrial plant for interacting with components of the industrial plant is provided. The topology diagram comprises a plurality of objects, which each represent a component of the industrial plant, and a plurality of connections, which each represent a logical and/or a physical connection between at least two of the components. In a step 102, for each zoom-level of the zoomable diagram, a zoomed diagram is generated. The zoomed diagram comprises a zoomed view of each one of the plurality of objects and the plurality of connections. The zoomed view is generated by applying at least following rules to each object:

from a first predefined zoom-level, collapse all objects of a plant-segment to one object and keep only connections that cross the plant-segment's border, and introduce an plant-segment related alarm measure as a function of all alarm statuses of the plurality of objects of the plant-segment.

In a step 103, the zoomed diagram for each of the zoom-levels is (optionally) stored, e.g. on a server. The server may be located in a cloud and/or on a site, where the zoomed diagram can be accessed by clients that are configured for displaying the zoomed diagrams. At least some of these clients may support an impression that the plurality of zoomed diagrams is one single zoomable diagram. An alternative would be to perform the generating steps during the interacting, i.e. during the next step. An advantage would be to save storage. A drawback may be that this requires a high computing power for a good user experience, i.e. without a need for long "computing pauses".

When interacting with the components of the industrial plant by utilizing the plurality of zoomable diagrams (depicted with broken lines), e.g. on one of the clients, in a step 104 for each plant-segment, the plant-segment related alarm measure is determined, and, in a step 105, the plant-segment related alarm measure is output, e.g., to a maintenance program or to a maintenance personnel, to initiate and/or support a healing of an alarm cause.

The plant or the industrial process plant may run an industrial process, for example in the field of chemical, mechanical, electrical and/or another process engineering. The alarm or abnormal behavior may be a behavior that deviates from an intentional behavior of the industrial process and/or of the industrial plant. The analysis of the alarm and/or taking at least some countermeasures may be supported by the zoomable diagram. The analysis and/or the countermeasures may be performed by an operator and/or a computer program.

The zoomable diagram may be a topology diagram—sometimes also called "process graphics"—, for instance a diagram providing semantics of a piping and instrumentation diagram, P&ID, or a similar topology diagram. The zoomable diagram may be enriched with further information, e.g. pictures of at least some components, its lifetime behavior, or others. The zoomable diagram may be a multi-zoom-level diagram, which may comprise a plurality of zoomed diagrams, i.e. one zoomed diagram for each zoom-level of the zoomable diagram. The topology diagram of at least a part of the industrial plant may serve as a basis for the zoomable diagram. The topology diagram may be used for observing and/or for interacting with the process control system of the plant and/or with the plant's components. The topology diagram comprises a plurality of objects, which each represent a component of the industrial plant, for instance components like a tank or vessel, a pump, a valve, other actuators, a sensor; the industrial plant has, in many cases, a plurality of these components. The topology diagram further comprises a plurality of connections, which each represent a logical and/or a physical connection between at least two of the components. The physical connection may be a tube or another passage for a fluid and/or a medium, for instance for water, oil, gas, other fluids, emulsions, suspensions, etc. The logical connection may be an electrical (wired or wireless), optical, pneumatic, hydraulic, and/or another connection.

Generating the zoomable diagram comprises generating a zoomed diagram for each zoom-level of the zoomable diagram. A zoom-level may be defined by its factor of scaling down, e.g. a zoom-level of 2 may indicate a scaling-down by a factor of ½. Note that the zoom-level is not necessarily an integer value. The zoomed diagram comprises a zoomed view of each one of the plurality of objects and the plurality of connections. The generating may be done by a computer program, e.g. by a so-called HMI-generator (HMI: Human Machine Interface). The zoomed view is generated by applying a set of rules to each object, e.g. pre-defined topology model abstraction rules to create the zoomable diagram on a configurable number of zooming levels or zoom-levels. Note that a "first/second/third/(predefined) zoom-level" does not necessarily mean a zooming factor by 1/2/3/ etc., but it could mean "any" zooming factor. Furthermore, that a "first (predefined) zoom-level" can designate a zooming factor that differs from a "second (predefined) zoom-level"; however, in at least some embodiments, the zooming factor of a "first/second/third/ . . . (predefined) zoom-level" may designate the same zooming factor. Any one of the a "first/second/third/ . . . (predefined) zoom-level" may designate a zooming factor different from 1, for instance greater than 1.

One rule may be to collapse, from a first predefined zoom-level, all objects of a plant-segment—or other higher level aggregates or segments—to one object. Note that "from" a predefined zoom-level may mean "at zooming factor higher (or equal) than designated by said zoom-level". The first predefined zoom-level may depend on the complexity and/or the number of components of the plant-segment. The first predefined zoom-level may designate a zoom-factor range of, e.g., between 5 and 20, e.g. around 15. "From" a zoom-factor means that for applying this rule, the zoom-factor needs to be equal or higher than the "from" value. For the collapsed plant-segment object, all "inner" connections are deleted, and only "outer" connections are kept, i.e. only connections that cross the plant-segment's border.

For recognizing the plant-segment's border, and/or the components within said border, the border may be marked manually (e.g. by marking ingoing and/or outgoing connections, or by drawing a frame around all components or elements of a specific plant segment). Additionally or as an alternative, markers for plant-segments may be used, e.g., prefixes in the topology diagram's naming, or structures from the process graphics. As an example, a component named (according to an arbitrary systematic) called "A1290-01-60-P33-001" may indicate a component within a plant segment "60", a component named "A1290-01-40-P33-001" may indicate a component within a plant segment "40", etc. The plant-segments may be mutually exclusive. In some case, e.g. if certain plant components are designated to multiple plant segments, partially overlapping frames can occur. These are considered as rare special cases and need human review to be either accepted due to visual clearness or be resolved by manually assigning the component to a specific, single frame.

One rule, possibly combined with the above rule, may be to introduce a plant-segment related alarm measure as a function of all alarm statuses of the plurality of objects of the plant-segment. As an example, the plant-segment related alarm measure may be a number (integer or float), say, in a range of 0 to 9, where "0" may indicate "no alarm" and "9" may indicate "highly crucial alarm". The alarm status of each of the plurality of objects may have the same range, or any other range. The function may be an indicator of, e.g., the highest current alarm level of this plant-segment, a number of alarms, a combined function, or another function. The function may map the plurality of alarm statuses of the objects within the plant-segment to one or to more values, e.g. to "8" (e.g. indicating the highest current alarm level), or a tupel "<8; 3>" (highest current alarm=8, number of alarms=3). Besides the objects, also connections may be source of an alarm. As an example, at or from the first predefined zoom-level, the frame for that segment may get a color, e.g. red, and then, this segment may be used for starting the alarm analysis. KPIs (KPI: Key Performance Indicator) may be treated analogously.

Then, the zoomed diagrams for each of the zoom-levels—i.e. the "collapsed" (or "folded") plant-segments, or a plurality of them—can (optionally) be stored. An alternative would be to perform the generating steps during the interacting.

The zoomed diagrams can be used for interacting with the components of the industrial plant. One such interacting scenario may be to call the zoomable diagram of an industrial plant, which may, e.g., show a "top level view" of the plant, which only shows the plant-segment views, i.e. highly zoomed-out. Then, for each plant-segment, the plant-segment related alarm measure are determined. For example, the zoomable diagram may determine or compute the plant-segment related alarm measure of segment "D", resulting in outputting the plant-segment related alarm measure, e.g. a value "8", and, based on this value, may color the segment "D" red. This value and/or color may be output, e.g., to a maintenance program or to a maintenance personnel. The outcomes of using the zoomable diagram, e.g. the outputting, may be a starting point for further searches for healing a cause of the alarm. The cause may possibly be the root-cause of the alarm. The cause may be in the same plant-segment, and/or in a different part of the topology diagram. The investigations may be supported by using different zoom-levels of the zoomable diagram.

This method describes a way to provide an at least partly automated method for providing a zoomable topology diagram. An HMI-generator, which uses said method, can generate zooming process graphics without human engineering labor from, for example, topology models. The term "zooming" refers to an ability—e.g. used by an operator of the plant—to effectively scale down or blow up a process graphic view in response to some instructions. The method makes zooming process graphics economically viable and may, thus, provide process plant operators with a more efficient plant navigation and visualization that may contribute to increase their effectiveness significantly. The HMI generator is supposed to be used during automation engineering for a process production plant and can also be used during plant maintenance end enhancement. The HMI generator may take data of a plant specification—a topology diagram of at least a part of the industrial plant for interacting with components of the industrial plant—as input and may produce process graphics to be displayed, e.g. by client software.

In various embodiments, the method further comprises the step of determining, for each plant-segment, a plant-segment related KPI measure, wherein the KPI measure is a function of all KPIs of the plurality of objects of the plant-segment. The KPI measure may be treated analogously to the alarm as described above. For instance, when all objects of a plant-segment are collapsed to one object (e.g. from a first predefined zoom-level and/or zoom-factor) the plant-segment related KPI measures are determined, and displayed on the "high-level view" of plant-segments. Also coloring may be done. Additionally or as an alternative, trend charts of KPIs may be displayed and/or stored.

In various embodiments, each of the object's alarm statuses and the plant-segment related alarm measure, and, where applicable, the object's KPI status and the plant-segment related KPI measure, are displayed by highlighting the object or the plant-segment, respectively. Highlighting can be done, e.g., by coloring the collapsed object and/or a text or value of the object, by a bold, italic (etc.) font, by increasing an object's size, and/or by further measures.

In some embodiments, the method further comprises the step of increasing a size of off-page references, from a second predefined zoom-level. The second predefined zoom-level may designate the same zoom-factor as the first zoom-level.

In many cases, complex graphics are structured into multiple diagram pages, where each page fills an entire screen. To navigate to other pages, the graphic may contain certain buttons or hyperlinks, which are the "off-page references". Clicking them directly opens another page of the complex graphic. It may be advantageous to increase the size or visual representation of off-page references on defined zoom-levels, because they may become more important on higher zoom-levels. Additionally or as an alternative, the off-page references may be hidden, only plant segment frames may be displayed, possibly dependent on the zoom-level.

In various embodiments, the zoomed view is generated by applying following additional rule to each object: Scale down the object proportional to the zoom-level or, from a third predefined zoom-level and/or if the scaled-down object is smaller than a predefined size, hide the object.

"Hiding" in the context of the present disclosure means to scale down the object to zero size. Hence, at some zoom-levels, larger elements (e.g. vessels) may remain visible, whereas smaller ones (e.g., instruments) may be hidden. Additionally or alternatively, the objects" xy-coordinates may be increase gradually, for a "fading-out" at higher zoom-levels. Connections may be kept up to a higher zoom-level and/or zoom-factor. Particularly, the connections to the object may be kept unchanged as long as the at least two of the objects are not hidden.

In some embodiments, the hiding of the object depends on a rank-stage of the object type. An exemplary ranking may be:

tank>pump>valve>other actuators>sensor.

The rank-stage may influence or determine the zoom-level and/or zoom-factor from which objects of this type are hidden, i.e. scaled down to zero size. The rank may be used to spread the hiding of elements across zoom-levels. The topology may be used to derive a connectivity and flow-direction-related information to, e.g., generate accurate topology views for all zoom-level. In these zoom-levels, elements with a rank below the rank of the zoom-level and/or zoom-factor are hidden but pipes are shown between remaining elements to indicate that, e.g., a tank is connected to another tank, but omitting all other elements on the path, such as valves, sensors, etc. Hence, a core set of general rules is provided, and potentially a database of domain-specific rule sets. The rule sets may be changed or augmented by rules specific to plant or customer preference. After changing the rule set, an automatic regeneration of zoom-levels may be triggered.

In various embodiments, the zoomed view is generated by applying at least one of following additional rules to each object:

From a fourth predefined zoom-level and/or zoom-factor, hide graphical and/or textual fillings of the object. For instance, if vessels have inner content, these are hidden from the fourth predefined zoom-level. Furthermore, textual annotations are hidden from the fourth predefined zoom-level. The hiding may also depend on the font size of the annotations, e.g. with font sizes smaller than a given size are hidden earlier (i.e. at lower zoom-levels and/or zoom-factors) than bigger ones. From some zoom-level and/or zoom-factor, all textual annotations may be hidden.

From a fifth predefined zoom-level and/or zoom-factor, merge redundant objects to one object. Redundant objects may correspond to components that support a safety function, e.g. fall back, warm redundancy or fail-safe. These objects may be merged into a single object. For example, a main pump with its auxiliary pump may be merged into a single pump, or two tanks into a single tank.

From a sixth predefined zoom-level and/or zoom-factor, merge all sensors, or all sensors of one type, to one sensor. For instance, all level sensors in a plant-segment may be merged to one sensor. Additionally or as an alternative, values of sensors may be consolidated, either for redundant sensors—i.e. merge a fill level of three sensors that sense the same tank—or for a Sum of sensors, e.g. to get the consolidated volumes of all tanks in each plant-segment. Additionally, a trend chart for the average filling level in that plant-segment may be created.

From a seventh predefined zoom-level and/or zoom-factor, merge all actuators of one type to one actuator. This may particularly apply to redundant actuators.

The fourth, fifth, sixth, and/or seventh predefined zoom-level, the zoom-factor may be in a range of 10 and 20, e.g. around 15.

In various embodiments, the rules and, where applicable, the rank-stages, are configurable. For example, the rules may be collected in a text-file, e.g. by using following syntax:

//hide inner elements
if zoom.level <5
for element in topologyModel:
if element.hasParent( ):
element.isVisible=false
//merge all sensor of a type into one
if zoom.level <5
for element in topologyModel:
if element is LevelSensor:
element.isVisible=false
topologyModel.addLevelSensor( )

The rank-stages of the object-types may be listed according to their rank, or with a rank-number before each object-type.

In various embodiments, the topology diagram has a semantic of a piping and instrumentation diagram, P&ID, and/or a semantic of a P&ID, which is enriched by a database containing meta-data about the designed process.

An aspect of the present disclosure also relates to a non-transitory computer-readable storage medium having a program stored therein, which, when executed on a processor, instructs the processor to perform the method described above and/or below.

A further aspect of the present disclosure relates to a control station of an industrial plant, the control station comprising an HMI-generator configured for performing a method as described above and/or below.

An aspect of the present disclosure also relates to a use of a control station of an industrial plant as described above and/or below for analyzing an alarm of a component of the plant and/or for finding a fault in a component of the plant. Finding a fault may relate, e.g., to a root-cause analysis. The root-cause of a fault may be a different component or even a different plant-segment, i.e. not the one that has sent the alarm. Finding a fault may include to find a fault in a connection.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising,"

"having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for generating a zoomable diagram of an industrial plant for an analysis of an alarm, the method comprising:
    providing a topology diagram of at least a part of the industrial plant for interacting with components of the industrial plant, wherein the topology diagram comprises a plurality of objects, each of the plurality of objects representing a component of the industrial plant, and a plurality of connections, each of the plurality of connections representing a logical and/or a physical connection between at least two of the components;
    generating, for each zoom-level of the zoomable diagram, a zoomed diagram comprising a zoomed view of each one of the plurality of objects and the plurality of connections, wherein a zoomed view is generated by applying rules to each object, the rules including, for a zoomed diagram having a plurality of zoom-levels:
        from a first predefined zoom-level, collapse all objects of a plant-segment to one object and keep only connections that cross the plant-segment's border; and
        introduce a plant-segment related alarm measure as a function of all alarm statuses of the plurality of objects of the plant-segment, and, when a scaled-down object is smaller than a predefined size, hide the scaled-down object based on a rank-stage of the object type, wherein the rank-stage comprises an association to a respective component of the industrial plant and a hiding priority relative to other components of the industrial plant;
    storing the zoomed diagram for each of the plurality of zoom-levels; and
    when interacting with the components of the industrial plant by utilizing the plurality of zoomable diagrams, determining, for each plant-segment, the plant-segment related alarm measure, and
    outputting the plant-segment related alarm measure for healing a cause of the alarm.

2. The method of claim 1, further comprising determining, for each plant-segment, a plant-segment related key performance indicator (KPI) measure, wherein the KPI measure is a function of all KPIs of the plurality of objects of the plant-segment.

3. The method of claim 1, wherein for each of a plurality of the object alarm statuses and a related plant-segment related alarm measure, displaying an object's KPI status and the plant-segment related key performance indicator (KPI) measure by highlighting the object or the plant-segment, respectively.

4. The method of claim 1, further comprising increasing a size of off-page references from a second predefined zoom-level.

5. The method of claim 1, wherein the zoomed view is generated by applying an additional rule to each object, the additional rule being: scale down the object proportional to the zoom-level or, from a third predefined zoom-level.

6. The method of claim 1, wherein the zoomed view is generated by applying at least one of following additional rules to each object:
    from a fourth predefined zoom-level, hide graphical and/or textual fillings of the object;
    from a fifth predefined zoom-level, merge redundant objects to one object;
    from a sixth predefined zoom-level, merge all sensors, or all sensors of one type, to one sensor, and/or
    from a seventh predefined zoom-level, merge all actuators of one type to one actuator.

7. The method of claim 1, wherein the rules and a plurality of rank-stages are configurable.

8. The method of claim 1, wherein the topology diagram has a semantic of a piping and instrumentation diagram (P&ID).

9. The method of claim 1, wherein the topology diagram has a semantic of a piping and instrumentation diagram (P&ID) which is enriched by a database containing metadata about the industrial plant.

10. A non-transitory computer-readable storage medium having a program stored therein, which, when executed on a processor, instructs the processor to perform a method comprising:
    providing a topology diagram of at least a part of the industrial plant for interacting with components of the industrial plant, wherein the topology diagram comprises a plurality of objects, each of the plurality of objects representing a component of the industrial plant, and a plurality of connections, each of the plurality of connections representing a logical and/or a physical connection between at least two of the components;
    generating, for each zoom-level of the zoomable diagram, a zoomed diagram comprising a zoomed view of each one of the plurality of objects and the plurality of connections, wherein a zoomed view is generated by applying rules to each object, the rules including, for a zoomed diagram having a plurality of zoom-levels:
        from a first predefined zoom-level, collapsing all objects of a plant-segment to one object and keep only connections that cross the plant-segment's border; and introducing a plant-segment related alarm measure as a function of all alarm statuses of the plurality of objects of the plant-segment, and, when a scaled-down object is smaller than a predefined size, hide the scaled-down object based on a rank-stage of the object type, wherein the rank-stage comprises an association to a respective component of the industrial plant and a hiding priority relative to other components of the industrial plant;

storing the zoomed diagram for each of the plurality of zoom-levels; and when interacting with the components of the industrial plant by utilizing the plurality of zoomable diagrams, determining, for each plant-segment, the plant-segment related alarm measure, and outputting the plant-segment related alarm measure for healing a cause of the alarm.

11. The non-transitory computer-readable storage medium of claim 10, further comprising determining, for each plant-segment, a plant-segment related key performance indicator (KPI) measure, wherein the KPI measure is a function of all KPIs of the plurality of objects of the plant-segment.

12. The non-transitory computer-readable storage medium of claim 11, wherein for each of a plurality of the object alarm statuses and a related plant-segment related alarm measure, displaying an object's KPI status and the plant-segment related KPI measure by highlighting the object or the plant-segment, respectively.

13. The non-transitory computer-readable storage medium of claim 10, further comprising increasing a size of off-page references from a second predefined zoom-level.

14. The non-transitory computer-readable storage medium of claim 10, wherein the zoomed view is generated by applying an additional rule to each object, the additional rule being: scale down the object proportional to the zoom-level or, from a third predefined zoom-level.

15. The non-transitory computer-readable storage medium of claim 10, wherein the zoomed view is generated by applying at least one of following additional rules to each object:

from a fourth predefined zoom-level, hide graphical and/or textual fillings of the object;

from a fifth predefined zoom-level, merge redundant objects to one object;

from a sixth predefined zoom-level, merge all sensors, or all sensors of one type, to one sensor, and/or from a seventh predefined zoom-level, merge all actuators of one type to one actuator.

16. The non-transitory computer-readable storage medium of claim 10, wherein the rules and a plurality of rank-stages are configurable.

17. The non-transitory computer-readable storage medium of claim 10, wherein the topology diagram has a semantic of a piping and instrumentation diagram (P&ID).

18. The non-transitory computer-readable storage medium of claim 10, wherein the topology diagram has a semantic of a piping and instrumentation diagram (P&ID) which is enriched by a database containing meta-data about the industrial plant.

* * * * *